(12) United States Patent
Lee et al.

(10) Patent No.: US 11,984,567 B2
(45) Date of Patent: May 14, 2024

(54) BATTERY MODULE

(71) Applicant: SK On Co., Ltd., Seoul (KR)

(72) Inventors: Seok Hwan Lee, Daejeon (KR); Seok Min Kim, Daejeon (KR); Hae Ryong Jeon, Daejeon (KR); Seung Hoon Ju, Daejeon (KR); Ha Neul Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 16/857,461

(22) Filed: Apr. 24, 2020

(65) Prior Publication Data

US 2020/0343604 A1    Oct. 29, 2020

(30) Foreign Application Priority Data

Apr. 26, 2019  (KR) .................. 10-2019-0049091

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/647* (2015.04); *H01M 10/653* (2015.04); *H01M 10/6553* (2015.04); *H01M 10/6554* (2015.04); *H01M 10/6555* (2015.04); *H01M 50/105* (2021.01); *H01M 50/178* (2021.01); *H01M 50/211* (2021.01); *H01M 50/224* (2021.01); *H01M 50/24* (2021.01); *H01M 50/26* (2021.01); *H01M 50/271* (2021.01); *H01M 50/54* (2021.01); *H01M 50/548* (2021.01); *H01M 50/553* (2021.01)

(58) Field of Classification Search
None
See application file for complete search history.

(56) References Cited

U.S. PATENT DOCUMENTS

| | | | |
|---|---|---|---|
| 10,490,868 B2 | 11/2019 | Nam et al. | |
| 2005/0047955 A1* | 3/2005 | King | C23C 2/06 420/520 |

(Continued)

FOREIGN PATENT DOCUMENTS

| | | |
|---|---|---|
| CN | 101022176 A | 8/2007 |
| CN | 106062998 A | 10/2016 |

(Continued)

OTHER PUBLICATIONS

Machine English translation of KR20160133776A from Espacenet originally published to Mun Nov. 2016 (Year: 2016).*

*Primary Examiner* — Ula C Ruddock
*Assistant Examiner* — Mary Grace Byram
(74) *Attorney, Agent, or Firm* — The Webb Law Firm (57) ABSTRACT

A battery module includes at least one battery cell; a first plate disposed on one side of the at least one battery cell to dissipate heat generated by the at least one battery cell externally; and a second plate disposed on the other side of the at least one battery cell to dissipate heat generated by the at least one battery cell externally, wherein an electrode lead of the at least one battery cell is disposed between the first plate and the second plate, and is disposed to be biased toward the first plate.

12 Claims, 7 Drawing Sheets

(51) Int. Cl.
  *H01M 10/647* (2014.01)
  *H01M 10/653* (2014.01)
  *H01M 10/6553* (2014.01)
  *H01M 10/6554* (2014.01)
  *H01M 10/6555* (2014.01)
  *H01M 50/105* (2021.01)
  *H01M 50/178* (2021.01)
  *H01M 50/211* (2021.01)
  *H01M 50/224* (2021.01)
  *H01M 50/24* (2021.01)
  *H01M 50/26* (2021.01)
  *H01M 50/271* (2021.01)
  *H01M 50/54* (2021.01)
  *H01M 50/548* (2021.01)
  *H01M 50/553* (2021.01)

(56) References Cited

U.S. PATENT DOCUMENTS

| | | | | |
|---|---|---|---|---|
| 2006/0068275 A1* | 3/2006 | Chung | ............... | H01M 50/172 |
| | | | | 429/121 |
| 2011/0052957 A1* | 3/2011 | Ohta | ............... | H01M 50/20 |
| | | | | 429/99 |
| 2011/0070474 A1* | 3/2011 | Lee | ............... | H01M 10/6551 |
| | | | | 429/120 |
| 2012/0301769 A1* | 11/2012 | Okada | ............... | H01M 10/6554 |
| | | | | 429/120 |
| 2013/0216896 A1* | 8/2013 | Kim | ............... | H01M 50/116 |
| | | | | 429/163 |
| 2014/0090780 A1* | 4/2014 | Jeong | ............... | H01M 50/178 |
| | | | | 156/274.4 |
| 2016/0126531 A1 | 5/2016 | Kim et al. | | |
| 2016/0359211 A1* | 12/2016 | Kenney | ............... | F28F 3/12 |
| 2017/0018816 A1 | 1/2017 | Na et al. | | |
| 2018/0138565 A1* | 5/2018 | Lee | ............... | H01M 10/6554 |
| 2018/0287226 A1 | 10/2018 | Yoo et al. | | |
| 2019/0006725 A1* | 1/2019 | Nam | ............... | H01M 10/647 |
| 2019/0393476 A1* | 12/2019 | Zeng | ............... | H01M 50/531 |
| 2020/0014005 A1 | 1/2020 | Lee et al. | | |
| 2020/0365836 A1* | 11/2020 | Jung | ............... | H01M 50/119 |
| 2021/0119309 A1* | 4/2021 | Jeong | ............... | H01M 10/482 |
| 2021/0344074 A1* | 11/2021 | Jung | ............... | H01M 50/543 |

FOREIGN PATENT DOCUMENTS

| | | | | |
|---|---|---|---|---|
| CN | 107534196 A | | 1/2018 | |
| CN | 108431991 A | | 8/2018 | |
| CN | 108649175 A | * | 10/2018 | ......... H01M 50/581 |
| EP | 3309865 A1 | | 4/2018 | |
| EP | 3783687 A1 | | 2/2021 | |
| EP | 3787065 A1 | | 3/2021 | |
| KR | 1020060134549 A | | 12/2006 | |
| KR | 20160133776 A | * | 11/2016 | |
| KR | 1020170070795 A | | 6/2017 | |
| KR | 1020170135473 A | | 12/2017 | |
| KR | 1020180099437 A | | 9/2018 | |
| KR | 1020180099438 A | | 9/2018 | |
| WO | WO-2017119789 A1 | * | 7/2017 | ........ H01M 10/6554 |
| WO | 2019017637 A1 | | 1/2019 | |
| WO | WO-2019017637 A1 | * | 1/2019 | ........ H01M 10/0436 |

\* cited by examiner

BATTERY MODULE

CROSS-REFERENCE TO RELATED APPLICATION

This application claims priority to Korean Patent Application No. 10-2019-0049091 filed Apr. 26, 2019, the disclosure of which is hereby incorporated by reference in its entirety.

BACKGROUND OF THE INVENTION

1. Field of the Invention

The present disclosure relates to a battery module.

2. Description of Related Art

Unlike primary batteries, secondary batteries may charge and discharge electrical energy. Thus, secondary batteries may be applied to various fields, for example, in the areas of digital cameras, mobile phones, notebook computers, hybrid vehicles, and the like. Examples of secondary batteries may include nickel-cadmium batteries, nickel-metal hydride batteries, nickel-hydrogen batteries, lithium secondary batteries, and the like.

Among these secondary batteries, a large amount of research into lithium secondary batteries having a relatively high energy density and a relatively high discharging voltage is in progress. Recently, lithium secondary batteries have been manufactured as pouched battery cells having flexibility. In this case, the pouched battery cells are provided as a plurality of pouched battery cell modules. The plurality of pouched battery cell modules may be configured to be connected and used as battery modules.

Meanwhile, when the battery module is used for an elongated period of time, heat may be generated by the battery module. In particular, an internal temperature of the battery module may rise rapidly, during a charging operation thereof. In this case, such an increase in temperature of the battery module may shorten a lifespan of the battery module, may decrease efficiency of the battery module, and, in the worst case, ignition or explosion may occur therein.

Therefore, the battery module requires a cooling system for cooling the battery cells accommodated therein. However, in the conventional case, there may be a problem that cooling efficiency may be significantly low, because it does not effectively dissipate heat generated by the battery cells.

SUMMARY OF THE INVENTION

An aspect of the present disclosure is to provide a battery module capable of effectively dissipating heat generated in a battery cell.

According to an aspect of the present disclosure, a battery module includes at least one battery cell; a first plate disposed on one side of the at least one battery cell to dissipate heat generated by the at least one battery cell externally; and a second plate disposed on the other side of the at least one battery cell to dissipate heat generated by the at least one battery cell externally, wherein an electrode lead of the at least one battery cell is disposed between the first plate and the second plate, and is disposed to be biased toward the first plate.

In this aspect, the at least one battery cell may be disposed to be orthogonal to the first plate and the second plate, and the first plate may be disposed on a lower surface of the at least one battery cell.

In this aspect, the at least one battery cell may include an accommodating portion, having a rectangular shape, in which an electrode assembly is accommodated, and a sealing portion disposed along an external surface of the accommodating portion, wherein the sealing portion may only be formed on three sides of the accommodating portion.

In this aspect, the at least one battery cell may be disposed such that a side of the accommodating portion in which the sealing portion is not formed faces the first plate.

In this aspect, the first plate and the second plate may be formed of aluminum (Al).

In this aspect, the sealing portion may be fixed by an adhesive member, after a portion of the sealing portion is folded at least once.

In this aspect, the battery module may further include a heat transfer member filling at least a space, among a space between the at least one battery cell and the first plate and a space between the at least one battery cell and the second plate.

In this aspect, the heat transfer member may be formed of any one of a thermal grease, a thermally conductive adhesive, an epoxy resin, and a heat dissipation pad.

In this aspect, the battery module may further include a cooling device bonded to at least one of an external surface of the first plate and an external surface of the second plate.

In this aspect, the battery module may further include an insulating cover bonded to a side surface of the at least one battery cell in which the electrode lead is disposed, wherein the insulating cover may include a through-hole through which the electrode lead passes.

In this aspect, the at least one battery cell may include a pouch in which an electrode assembly is accommodated; and a sealant disposed between the electrode lead and the pouch, at least portion of the sealant extending outside of the pouch, and the insulating cover may include a slit into which the sealant is inserted.

In this aspect, the insulating cover may further include a protrusion disposed between the first plate and the electrode lead passing through the through-hole and located outside the insulating cover.

BRIEF DESCRIPTION OF THE DRAWINGS

The above and other aspects, features, and advantages of the present disclosure will be more clearly understood from the following detailed description, taken in conjunction with the accompanying drawings, in which:

FIGS. 5 to 6B are enlarged perspective views illustrating the insulating cover of FIG. 1.

DESCRIPTION OF THE INVENTION

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the appropriate method he or she knows for carrying out the present disclosure. Therefore, the configurations described in the embodiments and drawings of the present disclosure are merely appropriate embodiments but do not represent all of the technical spirit of the present disclosure. Thus, the present disclosure should be construed as including all the changes, equivalents, and substitutions included in the spirit and scope of the present disclosure at the time of filing this application.

Hereinafter, embodiments of the present disclosure will be described in detail with reference to the accompanying drawings. In this case, it is to be noted that like reference numerals denote like elements in appreciating the drawings. Moreover, detailed descriptions related to well-known functions or configurations will be ruled out in order not to unnecessarily obscure the subject matter of the present disclosure. Based on the same reason, it is to be noted that some components shown in the drawings are exaggerated, omitted or schematically illustrated, and the size of each component does not exactly reflect its actual size.

Figure 1:
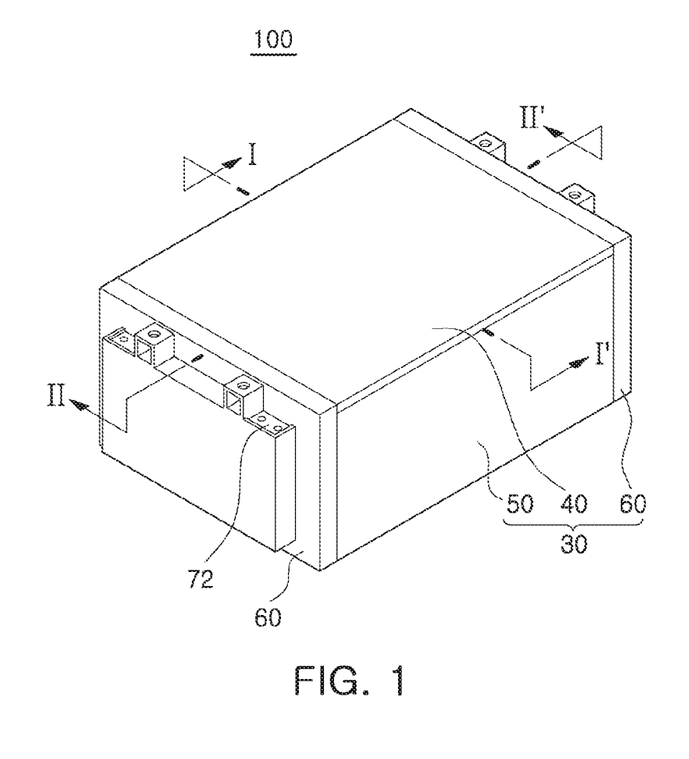
FIG. 1 is a perspective view schematically illustrating a battery module according to an embodiment of the present disclosure.
Figure 2:
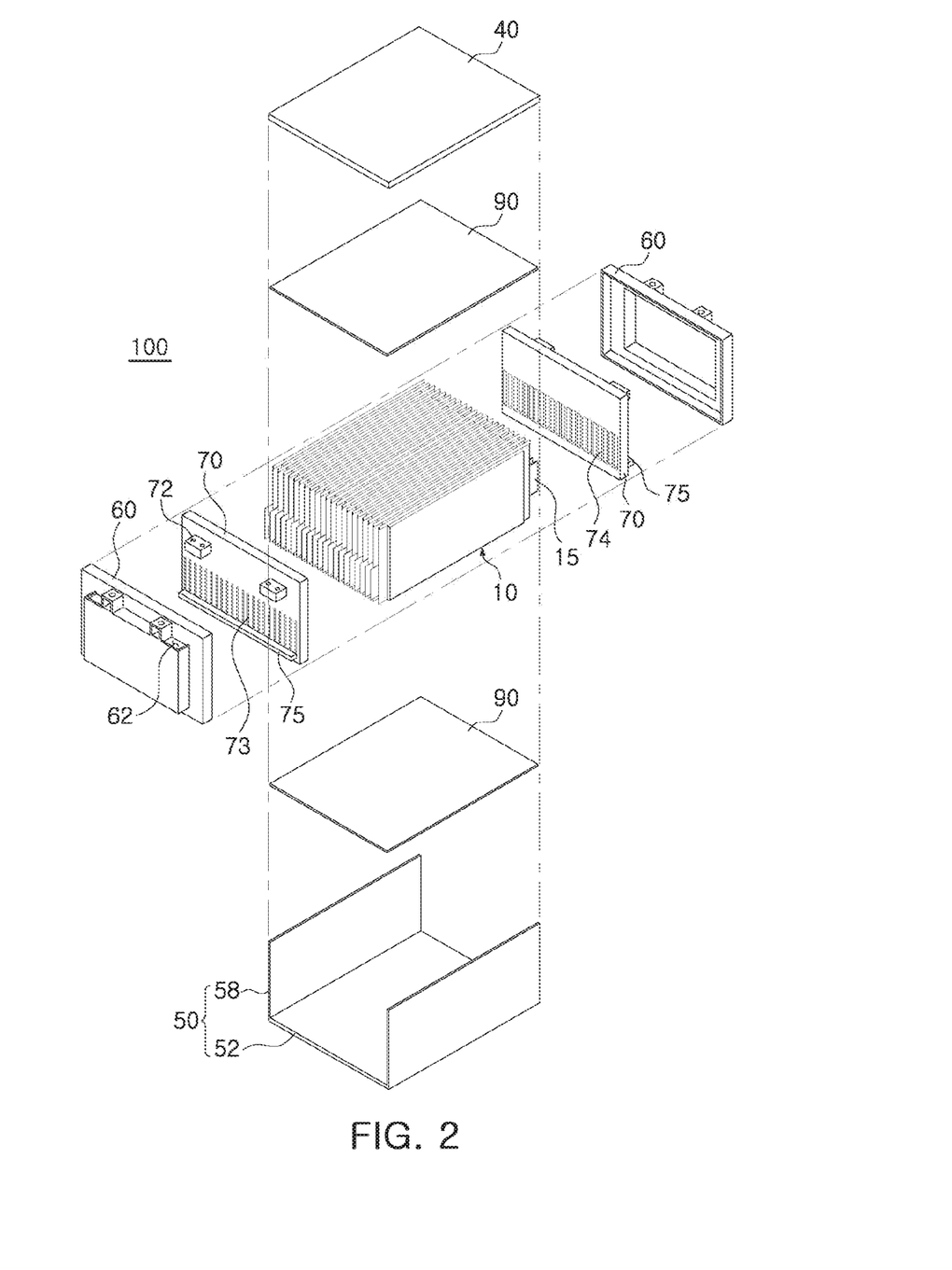
FIG. 2 is an exploded perspective view illustrating the battery module of FIG. 1.

FIG. 1 is a perspective view schematically illustrating a battery module according to an embodiment of the present disclosure, and FIG. 2 is an exploded perspective view illustrating the battery module of FIG. 1.

Figure 3:
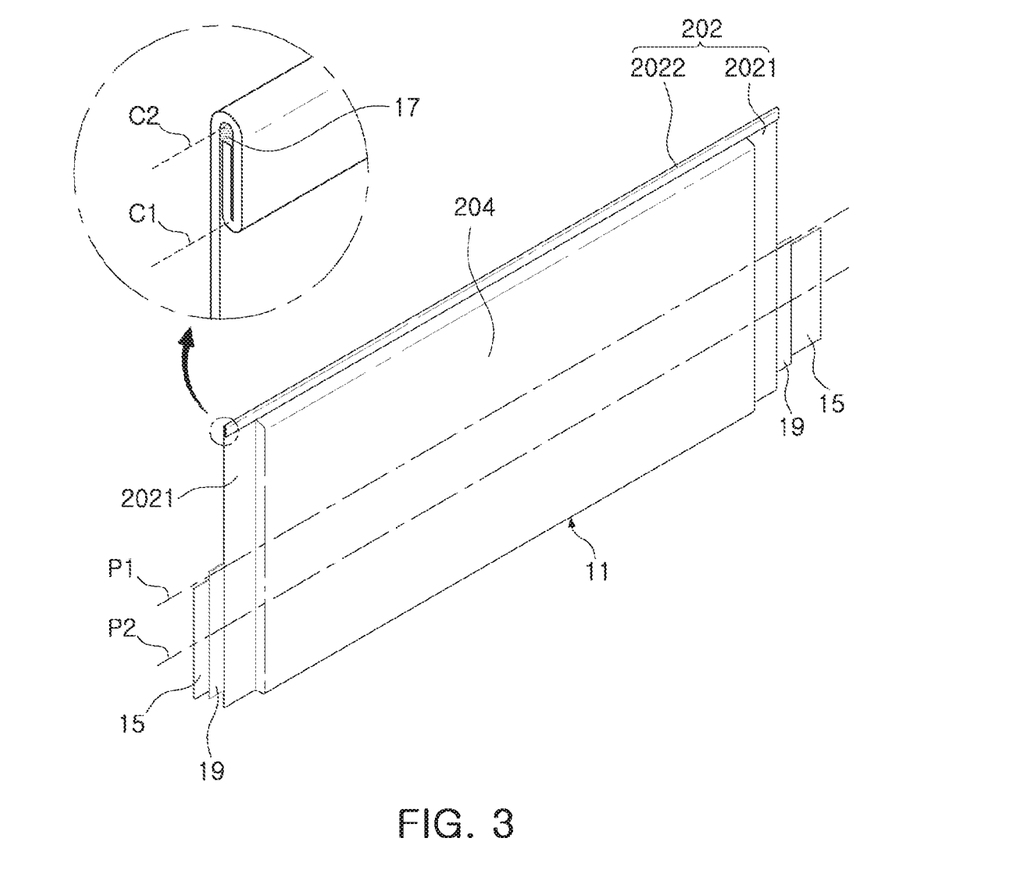
FIG. 3 is an enlarged perspective view illustrating the battery cell of FIG. 2.
Figure 4:
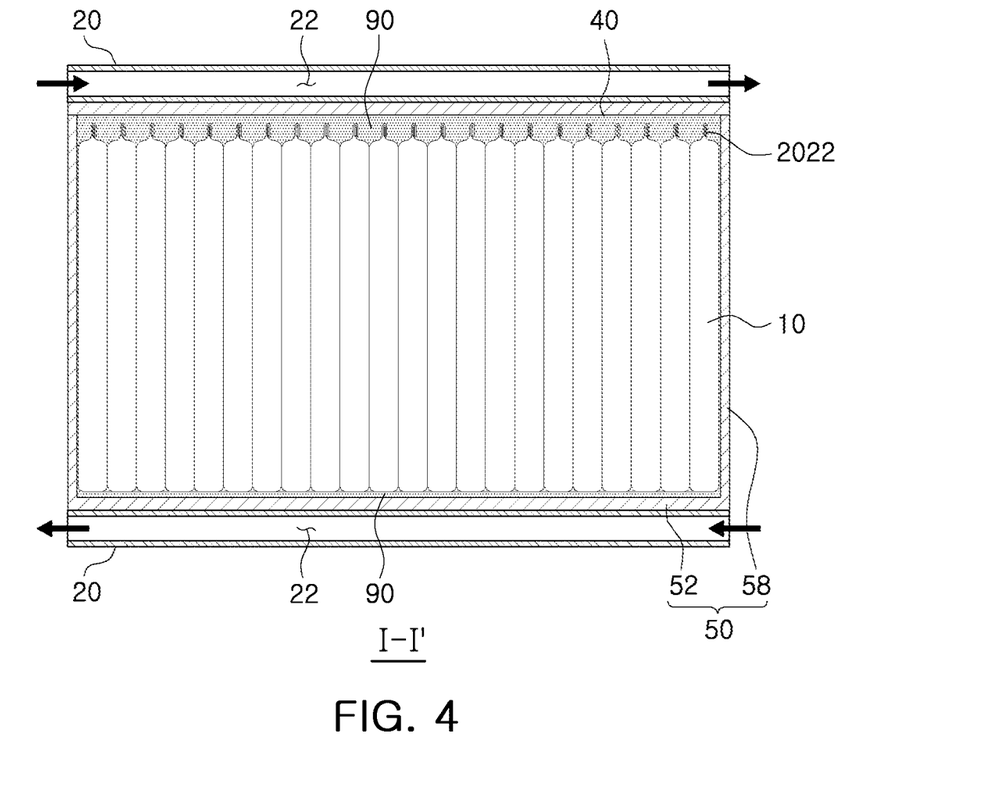
FIG. 4 is a cross-sectional view taken along line I-I' of FIG. 1.
Figure 5:
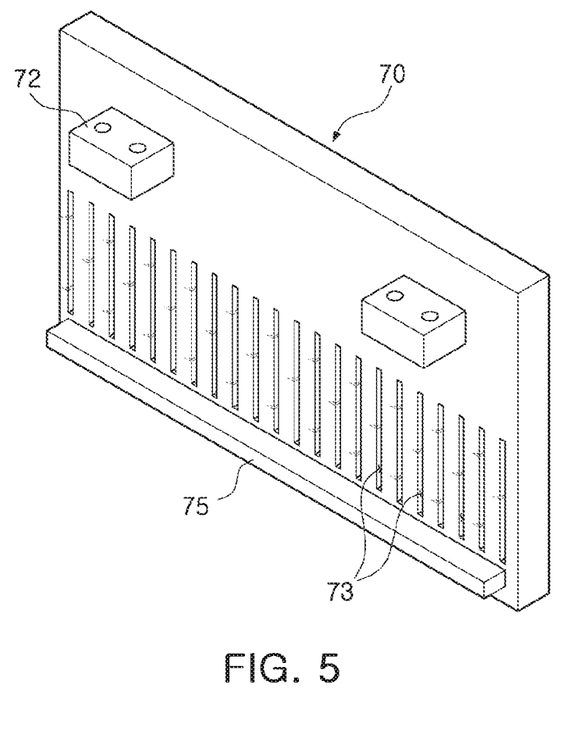
Figure 6A:
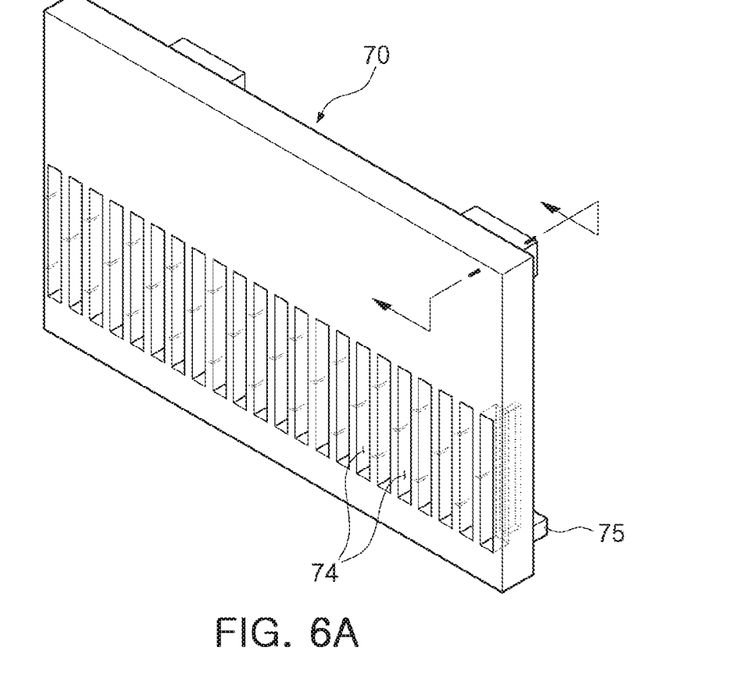
Figure 6B:
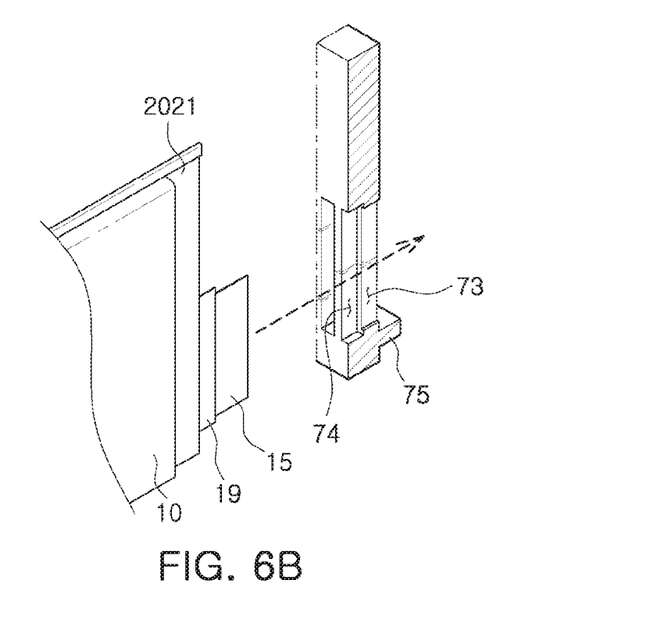
Figure 7:
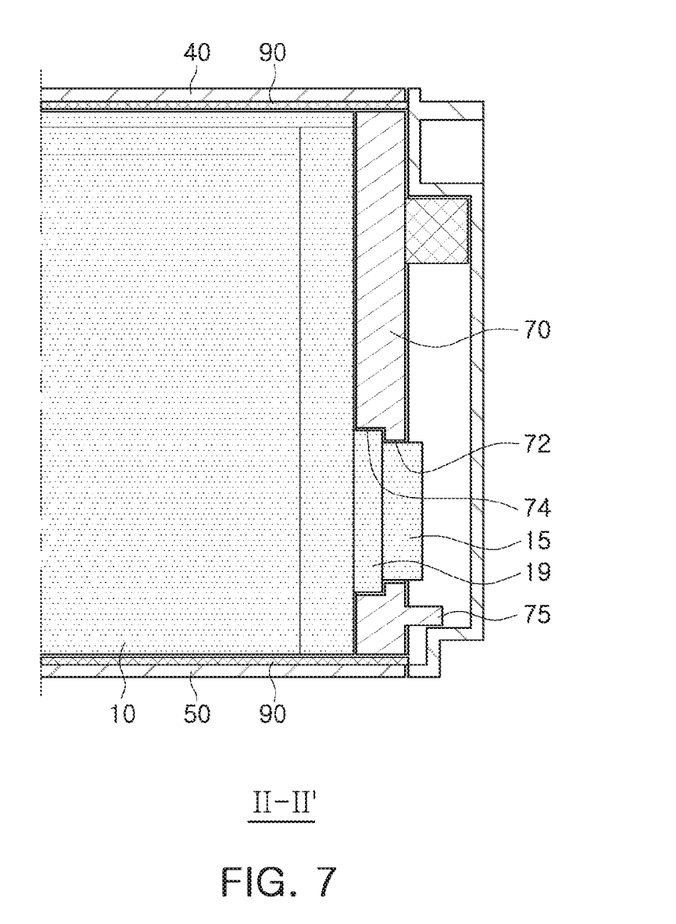
FIG. 7 is a partial cross-sectional view taken along line II-II' of FIG. 1.

FIG. 3 is an enlarged perspective view illustrating the battery cell of FIG. 2, FIG. 4 is a cross-sectional view taken along line I-I' of FIG. 1, FIGS. 5 to 6B are enlarged perspective views illustrating the insulating cover of FIG. 1, and FIG. 7 is a partial cross-sectional view taken along line II-II' of FIG. 1. In this case, a cooling device 20 is illustrated only in FIG. 4, and omitted in FIGS. 1, 2, and 7, for convenience of understanding.

Referring to FIGS. 1 to 7, a battery module 100 of this embodiment may include a battery cell 10, in plural, having an approximately hexahedral shape, an insulating cover 70, and a case 30.

The battery cell 10 may be provided as a plurality of battery cells stacked side by side, and may have a structure in which electrode leads 15 protrude from a body externally. The battery cell 10 may be, for example, a pouched secondary battery.

The battery cell 10 may be configured in a form in which an electrode assembly (not illustrated) is accommodated in a pouch 11.

The electrode assembly may include a plurality of electrode plates and electrode tabs, and may be housed in the pouch 11. In this case, each of the electrode plates may be composed of a positive electrode plate and a negative electrode plate, the electrode assembly may be configured in such a manner that the positive electrode plate and the negative electrode plate are stacked such that relatively wide surfaces face each other, with a separator therebetween.

The positive electrode plate and the negative electrode plate may be formed as a structure in which active material slurry is coated on a current collector. The slurry may be formed by stirring a granular active material, an auxiliary conductor, a binder, a plasticizer, and the like in a state in which a solvent is added.

In addition, in the electrode assembly, the plurality of positive electrode plates and the plurality of negative electrode plates may be stacked in a vertical direction. In this case, the plurality of positive electrode plates and the plurality of negative electrode plates may be provided with the electrode tabs, respectively, and may be in contact with and connected to an electrode lead (15 of FIG. 3) having the same polarities as the electrode plates, respectively.

In this embodiment, the electrode leads 15 may be provided as two electrode leads, and may be arranged to face in opposite directions to each other.

The pouch 11 may be formed to have a container shape, to provide an internal space in which the electrode assembly and electrolyte (not illustrated) are accommodated. In this case, portions of the electrode leads 15 of the electrode assembly may be exposed outside of the pouch 11.

The pouch 11 may be divided into a sealing portion 202 and an accommodating portion 204.

The accommodating portion 204 may be formed to have a container shape, to provide an internal space having a rectangular shape. The electrode assembly and the electrolyte may be accommodated in the internal space of the accommodation portion 204.

The sealing portion 202 may be formed to have a flange shape extending from the accommodating portion 204, formed to have the container shape, externally. Therefore, the sealing portion 202 may be disposed to have an edge shape along an external surface of the accommodating portion 204.

A method of bonding portions of the sealing portion 202 may be a thermal fusion process, but is not limited thereto.

In addition, in this embodiment, the sealing portion 202 may be divided into a first sealing portion 2021 in which the electrode leads 15 are disposed, and a second sealing portion 2022 in which the electrode leads 15 are not disposed.

In this embodiment, the pouch 11 may be manufactured by forming a piece of exterior material. Therefore, after forming at least one housing portion in the exterior material, the exterior material may be folded, such that the housing portion forms a space, to manufacture the pouch 11.

In this embodiment, the accommodating portion 204 may be formed to have a rectangular shape. The external surface of the accommodating portion 204 may be provided with the sealing portion 202 formed by bonding the exterior material. As described above, it is not necessary to form the sealing portion 202 on a surface on which the exterior material is folded. Therefore, in this embodiment, the sealing portion 202 may be formed on the external surface of the accommodating portion 204, and may be provided only on three sides of the accommodating portion 204, and the sealing portion 202 may be not disposed on any one side (a lower surface in FIG. 3) of the external surfaces of the accommodating portion 204.

In this embodiment, since the electrode leads 15 are disposed to face in opposite directions to each other, the two electrode leads 15 may be arranged in the sealing portions 202 formed on different sides. Therefore, the two sealing portions provided on three sides of the accommodating portion 204 may be configured to have two first sealing portions 2021 in which the electrode leads 15 are disposed, and one second sealing portion 2022 in which the electrode leads 15 are not disposed.

In addition, the battery cell 10 of this embodiment may include the sealing portion 202 in at least one folded form in order to increase reliability for bonding of the sealing portion 202 and to minimize an area of the sealing portion 202.

More specifically, the second sealing portion 2022 in which the electrode leads 15 are not disposed, among the sealing portion 202 according to this embodiment, may be folded twice, and may then fixed by an adhesive member 17.

For example, the second sealing portion 2022 may be folded 180° along a first bend line (C1) illustrated in FIG. 3, and may be then folded again along a second bend line (C2) illustrated in FIG. 3.

In this case, since an internal space of the second sealing portion 2022 may be filled with the adhesive member 17, the second sealing portion 2022 may be maintained in a shape folded twice by the adhesive member 17. The adhesive member 17 may be formed of an adhesive having relatively high thermal conductivity. For example, the adhesive member 17 may be formed of epoxy or silicone, but is not limited thereto.

In this embodiment, the adhesive member 17 may be formed of a material, different from a material of a heat transfer member 90, but, as necessary, may be made of the same material as the material of the heat transfer member 90.

When the adhesive member 17 having relatively high thermal conductivity fills the internal space of the second sealing portion 2022, the second sealing portion 2022 may rapidly transfer heat from the battery cell to the heat transfer member 90.

A sealant 19 may be inserted between the electrode leads 15 and the first sealing portion 2021. The sealant 19 may be configured to have an insulating film shape, to seal between the electrode leads 15 and the first sealing portion 2021. At least a portion of the sealant 19 of this embodiment may be extended and exposed outside the first sealing portion 2021.

The battery cell 10 configured as described above may be as a nickel metal hydride (Ni-MH) battery or a lithium ion (Li-ion) battery, capable of charging and discharging electricity, and may generate a current. In addition, the battery cells 10 may be vertically placed in the case 30 to be described later, respectively, and the vertically placed battery cells 10 may be layered and arranged in a horizontal direction. Therefore, the battery cells 10 may be arranged to be orthogonal to a first plate 50 and a second plate 40, respectively disposed below and above the battery cells 10.

Although not illustrated, at least one buffer pad or cooling plate may be disposed between two battery cells 10.

The buffer pad may be provided to prevent a volume of the battery cells in total from expanding, when a specific battery cell is expanded. The buffer pad may be formed of a foam made of polyurethane, but is not limited thereto.

The cooling plate may be provided to quickly transfer heat generated by the battery cells 10 to the cooling device 20. Therefore, the cooling plate may be disposed to contact the heat transfer member 90 or the case 30.

The cooling plate may be made of a metal material having relatively high thermal conductivity, but is not limited thereto.

In addition, the battery cells 10 of this embodiment may be arranged such that the electrode leads 15 are biased toward one side of the accommodating portion 204.

The electrode leads 15 of this embodiment may be disposed relatively adjacent to the lower surface of the battery cell 10 in which the sealing portion 202 is not disposed. Therefore, the electrode leads 15 may be disposed to be relatively spaced apart from the second sealing portion 2022 formed on the upper surface of the battery cell 10.

As illustrated in FIG. 3, based on a cell center line (P1) passing through a center of the battery cell 10, a lead center line (P2) passing through a center of the electrode lead 15 may be located below the cell center line (P1) (between the cell center line and the lower surface of the battery cell).

In this embodiment, the electrode leads 15 may be entirely located below the cell center line (P1). However, the present disclosure is not limited thereto, and at least a portion of the electrode leads 15 may be configured to be located above the cell center line (P1).

When a lower end of the electrode lead 15 contacts the first plate 50, a short circuit may occur. Therefore, the lower end of the electrode lead 15 may be disposed to be spaced apart from the first plate 50 by a predetermined distance.

Therefore, the electrode leads 15 of this embodiment may be disposed in various positions within ranges in which the lead center line (P2) is located below the cell center line (P1) and the lower end of the electrode lead 15 is spaced apart from the first plate 50.

Through such a configuration, the battery module according to this embodiment may increase a heat dissipation effect of the battery cell 10.

In general, a portion in which heat is most severely generated in the battery cell 10 may be the electrode leads 15, or a portion in which the electrode leads 15 are connected to the electrode assembly. Therefore, when the heat of the electrode lead 15 is not effectively dissipated, heat dissipation performance of the battery module may be deteriorated.

Since the sealing portion 202 may be not disposed on the lower surface of the battery cell 10 of this embodiment, the electrode assembly may be disposed very adjacent to the first plate 50. Since the second sealing portion 2022 may be disposed on the upper surface of the battery cell 10, a distance between the electrode assembly and the first plate 50 may increase by a size of the second sealing portion 2022.

Therefore, when a path of dissipating heat through the lower surface of the battery cell 10 is used, heat of the battery cell 10 may be dissipated more effectively.

In order to further reduce a magnitude of the path of dissipating heat, in the battery cell 10 of this embodiment, the electrode leads 15 having the greatest heat generation may be arranged adjacent to the lower surface of the battery cell 10. Therefore, the electrode leads 15 may be disposed in a position biased toward the first plate, such that a magnitude of the path of dissipating heat may be reduced by a distance between the cell center line (P1) and the lead center line (P2).

The lower surface of the battery cell 10 may refer to a surface on which the sealing portion 202 is not formed. Therefore, when the battery cell 10 is disposed such that the second sealing portion 2022 faces in a downward direction, a surface on which the sealing portion 202 is not formed may be provided as the upper surface of the battery cell 10, and the electrode leads 15 may be disposed to be biased toward the upper surface of the battery cell 10.

The case 30 may define an appearance of the battery module 100, and may be disposed outside the plurality of battery cells 10 to protect the battery cells 10 from an external environment. At the same time, the case 30 of this embodiment may also function as a cooling member of the battery module.

The case 30 of this embodiment may include the first plate 50 disposed on one surface of the battery cells 10, the second plate 40 disposed on the other surface of the battery cells 10, and a side cover 60 disposed on side surfaces the battery cells 10 on which the electrode leads 15 are arranged. The first plate 50 and the second plate 40, among them, may function as cooling members of the battery module 100.

In this embodiment, the first plate may refer to a plate disposed relatively adjacent to the electrode leads 15 of the battery cell 10, among the plates 40 and 50 disposed above and below the battery cell 10.

In this embodiment, since the electrode leads 15 may be disposed adjacent to the lower surface of the battery cell 10, the first plate may be defined as a plate disposed below the battery cell 10. When the electrode leads 15 are configured to be disposed adjacent to the upper surface of the battery cell 10, the first plate may be defined as a plate disposed on the upper surface of the battery cell 10.

The first plate 50 may include a lower plate 52 disposed below the battery cells 10 to support the lower surfaces of the battery cells 10, and a side plate 58 supporting the side surfaces of the battery cells 10 on which the accommodating portion 204 of the battery cells 10 is disposed. The first plate 50 may be also configured to have the side plate 58 and the lower plate 52 as independent components, as necessary.

The side plate 58 may extend from both sides of the lower plate 52, and may be disposed on the side surface of the battery cells 10, stacked and arranged in the horizontal direction, to support the accommodating portion 204 of the battery cells 10.

In order to firmly support the battery cell 10, the side plate 58 may be configured to contact the accommodating portion 204 of the battery cell 10. However, the present disclosure is not limited thereto, and various modifications may be made as necessary, such as through a heat dissipation pad, a buffer member, or the like between the side plate 58 and the accommodating portion 204.

The first plate 50 configured as described above may be made of a material having relatively high thermal conductivity such as metal. For example, the first plate 50 may be made of aluminum. However, the present disclosure is not limited thereto, and various materials may be used as long as the material has similar strength and thermal conductivity, even when it is not a metal.

The second plate 40 may be disposed above the battery cells 10 and bonded to the upper surfaces of the battery cells 10. In addition, the second plate 40 may be fastened to the top of the side plate 58 of the first plate 50. Therefore, when the second plate 40 is fastened to the first plate 50, the second plate 40 and the first plate 50 may be configured to have a tubular member shape having an empty interior.

In a similar manner to the first plate 50, the second plate 40 may be made of a material having relatively high thermal conductivity such as metal. The second plate 40 may be made of aluminum. However, the present disclosure is not limited thereto, and various materials may be used as long as the material has similar strength and thermal conductivity, even when it is not a metal.

The first plate 50 and the second plate 40 may be bonded by a welding process or the like. However, the present disclosure is not limited thereto, and various modifications may be possible, such as by bonding thereof using a sliding process, by bonding thereof with a fixing member such as a bolt, a screw, or the like, or by others.

The heat transfer member 90 may be filled in at least one space, among a space between the battery cells 10 and the first plate 50 and a space between the battery cells 10 and the second plate 40.

The heat transfer member 90 may transfer heat generated by the battery cell 10 to the case 30. To this end, the heat transfer member 90 may be made of a material having relatively high thermal conductivity. For example, the heat transfer member 90 may be formed of any one of a thermal grease, a thermally conductive adhesive, an epoxy resin, and a heat dissipation pad, but is not limited thereto.

The heat transfer member 90 may be disposed in a pad shape on an internal surface of the case 30, or may be coated on the internal surface of the case 30 in a liquid or gel state.

Therefore, the second sealing portion 2022 may be disposed and fixed in the heat transfer member 90, and heat released through the second sealing portion 2022 may be quickly transferred to the first plate 50 through the heat transfer member 90.

The heat transfer member 90 of this embodiment may have relatively high insulation, for example, a material having a dielectric strength in a range of 10 to 30 KV/mm may be used.

Therefore, the battery module 100 according to this embodiment may maintain insulation between the battery cells 10 and the case 30 by the heat transfer member 90 disposed around the battery cells 10, even when the insulation may be partially not functioned in the battery cell 10.

In addition, since the heat transfer member 90 is disposed to fill the space between the battery cells 10 and the case 30, overall rigidity of the battery module 100 may be also reinforced.

In this embodiment, the case in which the heat transfer member 90 is provided as a plurality of heat transfer members disposed on both below and above the battery cells 10 is illustrated as an example, but is not limited thereto. The heat transfer member 90 may be also disposed below or above the battery cells 10. In addition, the heat transfer member 90 may be disposed between the side surfaces and the side plates of the battery cells 10, as necessary.

The side cover 60 may be respectively bonded to both side surfaces of the battery cells 10 on which the electrode leads 15 are arranged.

The side cover 60 may be bonded to the first plate 50 and the second plate 40 to form an external shape of the battery module 100, together with the first plate 50 and the second plate 40.

The side cover 60 may be formed of an insulating material such as resin, and may include a through-hole 62 for exposing a connection terminal 72 of the insulating cover 70 to be described externally.

The side cover 60 may be bonded to the first plate 50 and the second plate 40 through fixing members such as screws, bolts, or the like, but is not limited thereto.

The insulating cover 70 may be interposed between the side cover 60 and the battery cells 10.

The insulating cover 70 may be bonded to one surface of the battery cells 10 on which the electrode leads 15 are disposed.

The electrode leads 15 may pass through the insulating cover 70, and may be interconnected at the outside of the insulating cover 70. To this end, as illustrated in FIG. 5, the insulating cover 70 may be provided with a plurality of through-holes 73 into which the electrode leads 15 are inserted.

In addition, as illustrated in FIG. 6, the insulating cover 70 may include at least one slit 74. The sealant 19 protruding from the first sealing portion 2021 of the battery cell 10 externally may be inserted into the slit 74.

As the sealant 19 is inserted into the slit 74, both side surfaces of the battery cell 10 on which the first sealing portion 2021 is disposed may be fixed to the insulating cover 70.

In this embodiment, the sealant 19 may be inserted into and firmly fixed to the slit 74. Thus, since the sealant 19 may be firmly bonded to the insulating cover 70, the electrode leads 15 may not directly face the first plate 50. As illustrated in FIG. 7, even when the electrode leads 15 are disposed to be biased toward the first plate 50, insulation between the electrode leads 15 and the first plate 50 may be ensured.

In addition, in order to ensure insulation between the electrode leads 15 disposed on the outside of the insulating cover 70 and the first plate 50, a protrusion 75 may be disposed below the through-holes 73 in the external surfaces of the insulating cover 70. The protrusion 75 protruding from the insulating cover 70 externally may be disposed between the electrode leads 15 passing through the through-hole 73 and the first plate 50, to block a directly facing the electrode leads 15 and the first plate 50.

Therefore, insulation between the electrode leads 15 and the first plate 50, even in the external surfaces of the insulating cover 70, may be ensured.

The insulating cover 70 may be provided with a connection terminal 72 connecting to the outside. Therefore, the battery cells 10 may be electrically connected to the outside through the connection terminal 72. For this purpose, the electrode leads 15 may be electrically connected to the connection terminal 72 through a circuit wiring (not illustrated) provided in the insulating cover 70.

The connection terminal 72 may be exposed to the outside through the through-hole 62 formed in the side cover 60. Therefore, the through-hole 62 of the side cover 60 may be formed in a size and a shape, corresponding to the connection terminal 72.

In addition, since the insulating cover 70 may include a circuit board (for example, a PCB) and a plurality of electronic elements mounted on the circuit board, a function of sensing a voltage of the battery cell 10 may be performed.

As illustrated in FIG. 4, the cooling device 20 may be bonded to a lower surface of the first plate 50 and an upper surface of the second plate 40. For convenience of explanation, the cooling device 20 is only illustrated in FIG. 4.

A water-cooled cooling device having a cooling passage 22 therein may be used in the cooling device 20 of this embodiment. However, the configuration of the present disclosure is not limited thereto, and an air-cooled cooling device may also be applied.

The cooling device 20 may be integrally bonded to the case 30, and may be included in the battery module 100. However, the present disclosure is not limited thereto, and the cooling device 20 may be provided in a device in which the battery module is mounted, separately from the battery module.

Although not illustrated, a heat dissipation pad may be disposed between the first plate 50 or the second plate 40 and the cooling device 20 for effective heat transfer.

The battery module 100 according to this embodiment configured as described above may fill the heat transfer member 90 between the battery cell 10 and the first and second plates 50 and 40, arranged the upper and lower surfaces of the battery cell 10. Therefore, a higher heat dissipation effect than the conventional technology may be provided.

In addition, since the electrode leads 15 of the battery cell 10 may be disposed to be biased toward the lower surface of the battery cell 10, a path for dissipating heat generated by the electrode leads 15 may be configured to be shortened. Therefore, the heat dissipation effect may be enhanced.

Although embodiments of the present disclosure have been described in detail above, it will be obvious to those of ordinary skill in the related field that the scope of the present disclosure is not limited thereto, and various modifications and variations may be made without departing from the technical spirit of the present disclosure described in the claims.

For example, in the above-described embodiment, the battery cell may include three sealing portions as an example, but the present disclosure is not limited thereto, and the case in which the sealing portion is provided on the lower surface of the battery cell may also be applied. In addition, in the above-described embodiment, the cooling device may be disposed outside the first plate and the second plate as an example, but various modifications may be possible, such as the cooling device is disposed inside the first plate and the second plate, the first plate and the second plate is configured to include a cooling passage, or other configurations.

In a battery module according to an embodiment of the present disclosure, since an electrode lead of a battery cell is disposed to be biased toward a lower surface of a case, a path of dissipating heat generated by the electrode lead may be minimized. Therefore, a heat dissipation effect may be improved.

While embodiments have been illustrated and described above, it will be apparent to those skilled in the art that modifications and variations could be made without departing from the scope of the present disclosure as defined by the appended claims.

What is claimed is:

1. A battery module comprising:
   at least one battery cell including two electrode leads disposed in directions opposite to each other;
   a first plate disposed on a first side of the at least one battery cell to dissipate heat generated by the at least one battery cell externally; and
   a second plate disposed on a second side of the at least one battery cell to dissipate heat generated by the at least one battery cell externally,
   wherein the at least one battery cell comprises an accommodating portion in which an electrode assembly is accommodated and a sealing portion disposed along at least a portion of a perimeter of the accommodating portion,
   wherein the accommodating portion includes a first side, a second side, and a third side on which an electrode lead among the two electrode leads is disposed,
   wherein the second side of the accommodating portion, opposite to the first side of the accommodating portion, is not formed with the sealing portion,
   wherein the at least one battery cell is disposed such that the second side of the accommodating portion faces the first plate,
   wherein each electrode lead of the at least one battery cell is disposed between the first side and the second side and is disposed to be biased toward the second side,
   wherein the sealing portion includes a first sealing portion sealing the third side of the accommodation portion and a folded second sealing portion sealing the first side of the accommodation portion, and
   wherein the folded second sealing portion is disposed adjacent to the second plate than the first plate, and the second side of the accommodation portion is disposed adjacent to the first plate than the second plate.

2. The battery module according to claim 1, wherein the at least one battery cell is disposed to be orthogonal to the first plate and the second plate, and
   the first plate is disposed on a lower surface of the at least one battery cell.

3. The battery module according to claim 2,
   wherein the sealing portion is only formed on three sides of the accommodating portion.

4. The battery module according to claim 1, wherein the sealing portion formed on the first side is folded at least once.

5. The battery module according to claim 3, wherein the sealing portion is fixed by an adhesive member, after a portion of the sealing portion is folded at least once.

6. The battery module according to claim 1, wherein the first plate and the second plate are formed of aluminum (Al).

7. The battery module according to claim 1, further comprising a heat transfer member filling at least a space, among a space between the at least one battery cell and the first plate and a space between the at least one battery cell and the second plate.

8. The battery module according to claim 7, wherein the heat transfer member is formed of any one of a thermal grease, a thermally conductive adhesive, an epoxy resin, and a heat dissipation pad.

9. The battery module according to claim 1, further comprising a cooling device bonded to at least one of an external surface of the first plate and an external surface of the second plate.

10. The battery module according to claim 1, further comprising an insulating cover bonded to a side surface of the at least one battery cell in which the electrode lead is disposed,
wherein the insulating cover comprises a through-hole through which the electrode lead passes.

11. The battery module according to claim 10, wherein the at least one battery cell comprises:
a sealant disposed between the electrode lead and the sealing portion, at least a portion of the sealant extending outside of the sealing portion,
wherein the insulating cover comprises a slit into which the sealant is inserted.

12. A battery module comprising:
at least one battery cell including two electrode leads disposed in directions opposite to each other;
a first plate disposed on a first side of the at least one battery cell to dissipate heat generated by the at least one battery cell externally;
a second plate disposed on a second side of the at least one battery cell to dissipate heat generated by the at least one battery cell externally; and
an insulating cover bonded to a side surface of the at least one battery cell in which the electrode lead is disposed,
wherein each electrode lead of the at least one battery cell is disposed between the first plate and the second plate, and is disposed to be biased toward the first plate,
wherein the insulating cover comprises a through-hole through which the electrode lead passes, and
wherein the insulating cover further comprises a protrusion disposed between the first plate and the electrode lead passing through the through-hole and located outside the insulating cover, to prevent the electrode lead and the first plate from directly facing each other, the protrusion ensuring insulation between the electrode lead disposed on the outside of the insulating cover and the first plate.

* * * * *